No. 667,108. Patented Jan. 29, 1901.
H. W. THURLOW & J. T. EPLER.
CAN OPENER.
(Application filed Apr. 30, 1900.)
(No Model.)
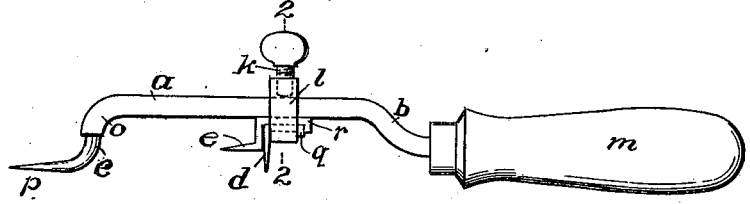
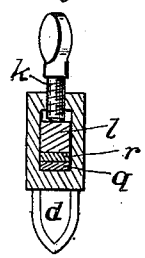
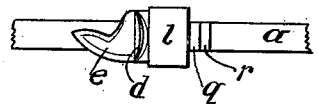
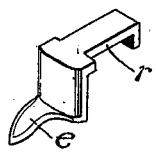
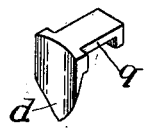
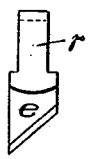
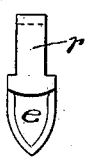
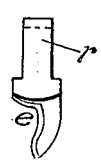
WITNESSES:
A. P. Knight
Harry Luckenbach
INVENTORS
Harry W. Thurlow
James T. Epler
BY
Pierre Barnes
their ATTORNEY
THE NORRIS PETERS CO., PHOTO-LITHO., WASHINGTON, D. C.

UNITED STATES PATENT OFFICE.

HARRY W. THURLOW AND JAMES T. EPLER, OF SEATTLE, WASHINGTON.

CAN-OPENER.

SPECIFICATION forming part of Letters Patent No. 667,108, dated January 29, 1901.

Application filed April 30, 1900. Serial No. 14,965. (No model.)

*To all whom it may concern:*

Be it known that we, HARRY W. THURLOW and JAMES T. EPLER, citizens of the United States, residing at Seattle, in the county of King and State of Washington, have invented certain new and useful Improvements in Can-Openers, of which the following is a specification, reference being had therein to the accompanying drawings.

This invention relates to can-openers, and specifically to an improvement in the can-opener shown and described in our application, Serial No. 13,831, filed April 21, 1900; and the object of the invention is to facilitate the repair and resharpening of the cutters, and generally to render the device more convenient and efficient in operation.

In the accompanying drawings, Figure 1 is a side elevation of a can-opener embodying our invention. Fig. 2 is a transverse section on the line 2 2 in Fig. 1. Fig. 3 is an under side view of the cutter portion of the device. Figs. 4 and 5 are detail views of the side and top cutters, respectively. Figs. 6, 7, and 8 are top views of various forms of the side cutter.

The improved can-opener comprises a shank $a$, with handle $m$, rectangular bend $o$, and curved penetrating and pivotal point $p$, terminating parallel to the shank. The shank is also preferably bent or offset near the handle, as shown at $b$, so as to bring the handle substantially in line with the cutters and the pivotal point of the instrument, which pivotal point is afforded by the neck portion $c$ of the point $p$, which is at right angles to the shank.

The block or clamp-frame $l$ is adapted to embrace the shank $a$ and to receive the shanks $q\ r$ of the two cutters $d\ e$, respectively adapted to cut the top and the side of the can. The blade-shanks aforesaid may be shaped to fit, respectively, over one another and into the clamp-frame $l$ and between the clamp-frame and the shank of the can-opener, as shown, so as to give a firmer attachment; but the fastening of same is effected mainly by the clamp-screw $k$, which on being screwed up tightens the clamp-frame so as to securely clasp the blades, while on loosening the said clamp-frame it may be slid or adjusted along the shank, so as to give any desired radius to the device. Thus a single clamp-screw serves both to clamp the blades and to hold the clamp-frame in position. The clamp-screw $k$ should be of sufficient length to screw the clamp-frame $l$ tightly when either one of the blades $d\ e$ is in the frame alone, as well as when both are in, so that either of such blades may be used alone or both may be applied in conjunction. Owing to the fact that the blades may be removed separately the repair or substitution thereof, and particularly the resharpening of either or both of them, is greatly facilitated. Another advantage of this removability is that a different form of cutter may be substituted for either of the cutters, according to the class of work in hand or the preference of the operator. Thus in Figs. 6, 7, and 8 are shown various forms of side cutters, any one of which may be applied in the same instrument, as desired, Figs. 6 and 8 showing reversely-directed cutters for right and left hand operation, and Fig. 7 a cutter adapted to work in either direction. The forms shown in Figs. 8 and 4 have an outward drawing action that is desirable in some cases.

Having now described our invention, what we claim as new therein, and desire to secure by Letters Patent, is—

1. In a can-opener, the combination with the shank, of a clamp-frame adjustable along said shank, and two removable cutting-blades, respectively adapted to cut the top and the side of a can, and having shanks fitting into said clamp-frame, and a single clamp-screw for clamping both of said shanks in said clamp-frame.

2. In a can-opener, the combination with the shank, of a clamp-frame embracing the shank and adjustable thereon, two removable cutting-blades respectively adapted to cut the top and the side of a can, and having shanks fitting into said clamp-frame and between the said frame and the shank of the can-opener, and a clamp-screw for clamping said clamp-frame to the shank of the can-opener, and at the same time clamping the blade-shanks.

In testimony whereof we affix our signatures in presence of two witnesses.

HARRY W. THURLOW.
    JAMES T. EPLER.

Witnesses:
 PIERRE BARNES,
 ERNEST E. GILMER.